US012749470B2

(12) United States Patent
Ishii et al.

(10) Patent No.: US 12,749,470 B2
(45) Date of Patent: Sep. 29, 2026

(54) INPUT DEVICE AND SOUND SIGNAL GENERATION DEVICE

(71) Applicant: YAMAHA CORPORATION, Hamamatsu (JP)

(72) Inventors: Jun Ishii, Hamamatsu (JP); Masao Noro, Hamamatsu (JP)

(73) Assignee: YAMAHA CORPORATION, Hamamatsu (JP)

(*) Notice: Subject to any disclaimer, the term of this patent is extended or adjusted under 35 U.S.C. 154(b) by 1175 days.

(21) Appl. No.: 17/743,616

(22) Filed: May 13, 2022

(65) Prior Publication Data

US 2022/0270580 A1 Aug. 25, 2022

Related U.S. Application Data

(63) Continuation of application No. PCT/JP2020/041338, filed on Nov. 5, 2020.

(30) Foreign Application Priority Data

Nov. 20, 2019 (JP) ................................ 2019-210009

(51) Int. Cl.
*G10H 1/34* (2006.01)

(52) U.S. Cl.
CPC ....... *G10H 1/344* (2013.01); *G10H 2220/221* (2013.01); *G10H 2220/281* (2013.01)

(58) Field of Classification Search
CPC ............. G10H 1/344; G10H 2220/221; G10H 2220/281
See application file for complete search history.

(56) References Cited

U.S. PATENT DOCUMENTS

| | | | | |
|---|---|---|---|---|
| 2,569,521 A | | 10/1951 | Greaves et al. | |
| 3,673,303 A | | 6/1972 | Amano | |
| 3,708,605 A | | 1/1973 | Ohno | |
| 3,749,806 A | * | 7/1973 | Rosenberg ........... | G10H 1/0555 984/319 |
| 4,580,478 A | | 4/1986 | Brosh et al. | |

(Continued)

FOREIGN PATENT DOCUMENTS

| | | |
|---|---|---|
| JP | H0660783 A | 3/1994 |
| JP | 2008026217 A | 2/2008 |
| JP | 2011119114 A | 6/2011 |

OTHER PUBLICATIONS

Office Action issued in Japanese Appln. No. 2021-558278 mailed Mar. 7, 2023. English machine translation provided.

(Continued)

*Primary Examiner* — Jianchun Qin
(74) *Attorney, Agent, or Firm* — ROSSI, KIMMS & McDOWELL LLP

(57) ABSTRACT

An input device includes a first operating element and a first sensor. The first sensor includes a first conductor, a first coil, and a first magnetic material forming an open magnetic circuit together with the first coil. A positional relationship between the first coil and the first magnetic material is fixed. A first distance between a first end portion of the first magnetic material and the first conductor varies according to the amount of operation on the first operating element. The first sensor outputs a first signal corresponding to the first distance.

12 Claims, 10 Drawing Sheets

(56) References Cited

U.S. PATENT DOCUMENTS

| | | | |
|---|---|---|---|
| 5,682,097 | A | 10/1997 | Bryant et al. |
| 2019/0011290 | A1 | 1/2019 | Utermoehlen et al. |

OTHER PUBLICATIONS

Office Action issued in Chinese Appln. No. 202080078248.3, dated Sep. 20, 2024. English translation provided.
English translation of Written Opinion issued in Intl. Appln. No. PCT/JP2020/041338 mailed Jan. 12, 2021, previously cited in IDS filed May 13, 2022.
Extended European Search Report issued in European Appln. No. 20889616.7, mailed Nov. 28, 2023.
International Search Report issued in Intl. Appln. No. PCT/JP2020/041338 mailed Jan. 12, 2021. English translation provided.
Written Opinion issued in Intl. Appln. No. PCT/JP2020/041338 mailed Jan. 12, 2021.
Chinese Office Action issued in Chinese Appln. No. 202080078248.3 dated Feb. 28, 2025. English machine translation provided.

* cited by examiner

INPUT DEVICE AND SOUND SIGNAL GENERATION DEVICE

CROSS REFERENCE TO RELATED APPLICATIONS

This application is a Continuation of International Patent Application No. PCT/JP2020/041338, filed on Nov. 5, 2020, which claims the benefit of priority to Japanese Patent Application No. 2019-210009, filed on Nov. 20, 2019, the entire contents of which are incorporated herein by reference.

FIELD

The present disclosure relates to an input device and a sound signal generation device.

BACKGROUND

In an electronic keyboard instrument or the like, pressing of a key is detected, and a sound signal is generated based on the detected result. The detection of a key depression is realized by a contact type sensor or a non-contact type sensor. The non-contact type sensor includes, for example, a magnetic induction type sensor (for example, U.S. Pat. No. 4,580,478).

SUMMARY

According to an embodiment of the present invention, an input device is provided including a first operating element and a first sensor. The first sensor includes a first conductor, a first coil, and a first magnetic material forming an open magnetic circuit together with the first coil. A positional relationship between the first coil and the first magnetic material is fixed. A first distance between a first end portion of the first magnetic material and the first conductor varies according to the amount of operation on the first operating element. The first sensor outputs a first signal corresponding to the first distance.

The input device may further include a second operating element and a second sensor. The second operating element is adjacent to the first operating element in a first direction. The second sensor includes a second conductor, a second coil, and a second magnetic material forming an open magnetic circuit together with the second coil. The second magnetic material has a second portion extending in a second direction different from the first direction with respect to the second coil. A positional relationship between the second coil and the second magnetic material is fixed. The second magnetic material is separated from the first magnetic material. A second distance between a second end portion on a second portion side of the second magnetic material and the second conductor varies according to the amount of operation on the second operating element. The second sensor outputs a second signal corresponding to the second distance. The first magnetic material has a first portion extending in the second direction with respect to the first coil. The first end portion may be an end portion on a first portion side of the first magnetic material.

The first conductor may be interlocked with the first operating element.

The first conductor may include a third coil.

A part of the first magnetic material may pass through the internal space of the first coil.

The first coil may be formed on a substrate, and the first coil may be arranged between at least a part of the first magnetic material and the first conductor at any one position in a range of movement of the first operating element.

According to an embodiment of the present invention, an input device is provided including a first operating element and a first sensor. The first sensor includes a first coil, a third coil, and a third magnetic material. The third coil is arranged between the first coil and the third magnetic material at any one position in a range of movement of the first operating element. A positional relationship between the third coil and the third magnetic material is fixed. The first distance between the first coil and the third coil varies according to the amount of operation on the first operating element. The first sensor outputs the first signal corresponding to the first distance.

The input device may further include a second operating element and a second sensor. The second operating element is adjacent to the first operating element in a first direction. The second sensor includes a second coil, a fourth coil, and a fourth magnetic material, the second coil and the fourth coil having a part in which winding directions are opposite to each other. The fourth coil is arranged between the second coil and the fourth magnetic material at any one position in a range of movement of the second operating element. A positional relationship between the fourth coil and the fourth magnetic material is fixed. The fourth magnetic material is separated from the third magnetic material. The first distance between the second coil and the fourth coil varies according to the amount of operation on the second operating element. The second sensor outputs a second signal corresponding to the second distance. The first coil may have a part in which the winding directions are opposite to each other.

In the first coil and the second coil, parts in which winding directions are opposite to each other may be aligned in the second direction different from the first direction.

The first operating element and the second operating element may have a longitudinal shape in the second direction.

According to an embodiment of the present invention, a sound signal generation device is provided including the input device described above and a generation unit configured to generate a sound signal based on the first signal and the second signal.

DESCRIPTION OF EMBODIMENTS

Figure 1:
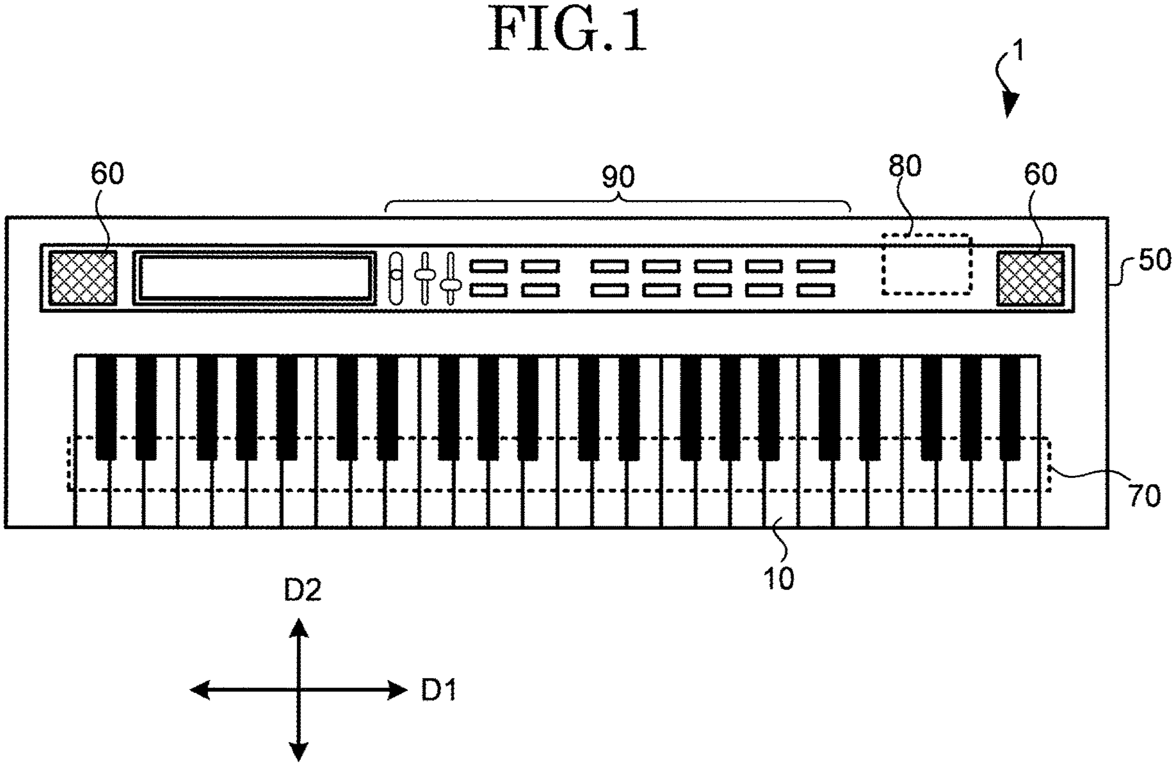
FIG. 1 is a diagram explaining a keyboard apparatus in a first embodiment of the present disclosure.

Hereinafter, a keyboard apparatus in an embodiment of the present invention will be described in detail with reference to the drawings. The following embodiments are examples of embodiments of the present invention, and the present invention should not be construed as being limited to these embodiments. In addition, in the drawings referred to in the present embodiment, the same portions or portions having similar functions are denoted by the same symbols or similar symbols (A, B, etc. denoted after numerals), and a repetitive description thereof may be omitted. Dimensional ratios in the drawings may differ from actual ratios for convenience of description, or some of the configurations may be omitted from the drawings.

Since a sensor using a magnetic field can be used as a distance sensor, the pressing amount of a key can be measured continuously. On the other hand, since the magnetic field spreads in various directions around a coil, EMC (Electromagnetic Compatibility) countermeasures are required. In addition, when a structure in which a plurality of keys is arranged as in a keyboard instrument is used, sensors corresponding to the plurality of adjacent keys may interfere with each other, and the measurement accuracy may be lowered. Therefore, when a magnetic induction type sensor is used, it was necessary to control the magnetic field formed by the coil according to the purpose of use.

One object of the present disclosure is to control the magnetic field formed by the coil of the magnetic induction type sensor.

First Embodiment

In the first embodiment, a keyboard apparatus used as an electronic keyboard instrument will be described. According to this keyboard apparatus, the keypress operation can be detected by a magnetic induction type sensor. Hereinafter, the keyboard apparatus will be described in detail.

[1. Summary of Keyboard Apparatus]

FIG. 1 is a diagram explaining a keyboard apparatus according to a first embodiment of the present invention. A keyboard apparatus 1 is an electronic keyboard instrument. In this example, the keyboard apparatus 1 is an electronic piano. The keyboard apparatus 1 includes a key 10, a casing 50, a speaker 60, a sound source unit 80 and an operation unit 90. In the following description, for convenience of description, a side with respect to the keyboard apparatus 1 where a player is present (a side on which the key 10 is present with respect to the casing 50) is defined as a front side, and a side opposite to the player is defined as a back side. Left, right, and up, and down are also defined as directions when viewed from the player.

A plurality of keys 10 (a first operating element and a second operating element) is arranged side by side in one direction. Here, a scale direction in which the plurality of keys 10 is arranged is referred to as a left-right direction D1 (a first direction). A direction perpendicular to the left-right direction D1 is referred to as a front-back direction D2 (a second direction). When the keyboard apparatus 1 is viewed from above, longitudinal direction of the key 10 is the same as the front-back direction D2. A direction perpendicular to both the left-right direction D1 and the front-back direction D2 is referred to as a vertical direction D3 (a third direction, see FIG. 2). The vertical D3 generally corresponds to the vertical direction when the keyboard apparatus 1 is placed flat. That is, when the keyboard apparatus 1 is placed horizontally, the left-right direction D1 and the front-back direction D2 are directions in the horizontal plane.

The key 10 can rotate with respect to the casing 50. A state in which the longitudinal direction of the key 10 coincides with the longitudinal direction of the front-back direction D2 is included in the rotation range of the key 10. The speaker 60, a keypress amount measuring unit 70, the sound source unit 80 and the operation unit 90 are arranged in the casing 50. When a user operates the key 10, a sound is generated from the speaker 60 by a sound generation function of the keyboard apparatus 1. The operation unit 90 is a device such as an operation button, a touch sensor and a slider, and receives an instruction for changing the type of the sound (tone) and volume of the sound to be generated, and outputs a signal corresponding to the input operation to the sound source unit 80. In addition, the keyboard apparatus 1 may include an interface for inputting and outputting signals to and from an external device. Examples of the interface include a terminal for outputting a sound signal to an external device, and a cable connecting a terminal for transmitting and receiving MIDI data, and the like.

The keypress amount measuring unit 70 includes a magnetic induction type sensor arranged for each of the plurality of keys 10. Each of the sensors corresponding to each key 10 detects a position (pressing amount) in a rotation range of the key 10. The keypress amount measuring unit 70 outputs key information specifying any of the plurality of keys 10 and pressing amount information corresponding to the pressing amount of the specified key 10 to the sound source unit 80. The pressing amount information may indicate a value of the pressing amount itself of the key 10, or it may be a value calculated from the pressing amount, such as a speed calculated from a change in the pressing amount, or may be information obtained by combining these. The combination of the keypress amount measuring unit 70 and the key 10 is an example of an input device. The detailed configuration of the keypress amount measuring unit 70 will be described later.

The sound source unit 80 (a generation section) is a signal processing circuit for generating a sound signal according to a performance operation to the key 10. Specifically, the sound source unit 80 generates a sound signal based on the information output from the keypress amount measuring unit 70, and outputs the generated sound signal to the speaker 60. The speaker 60 generates a sound corresponding to the sound signal by amplifying and outputting the sound signal output from the sound source unit 80.

[2. Internal Structure of Keyboard Apparatus 1]

Next, an internal structure of the keyboard apparatus 1 will be described. Here, an internal structure of the keyboard apparatus 1 will be described with reference to FIG. 2 and FIG. 3 schematically showing a cross-section when cutting the keyboard apparatus 1 in a plane having a left-right direction D1 in the normal line (plane including the front-back direction D2 and the vertical direction D3).

Figure 2:
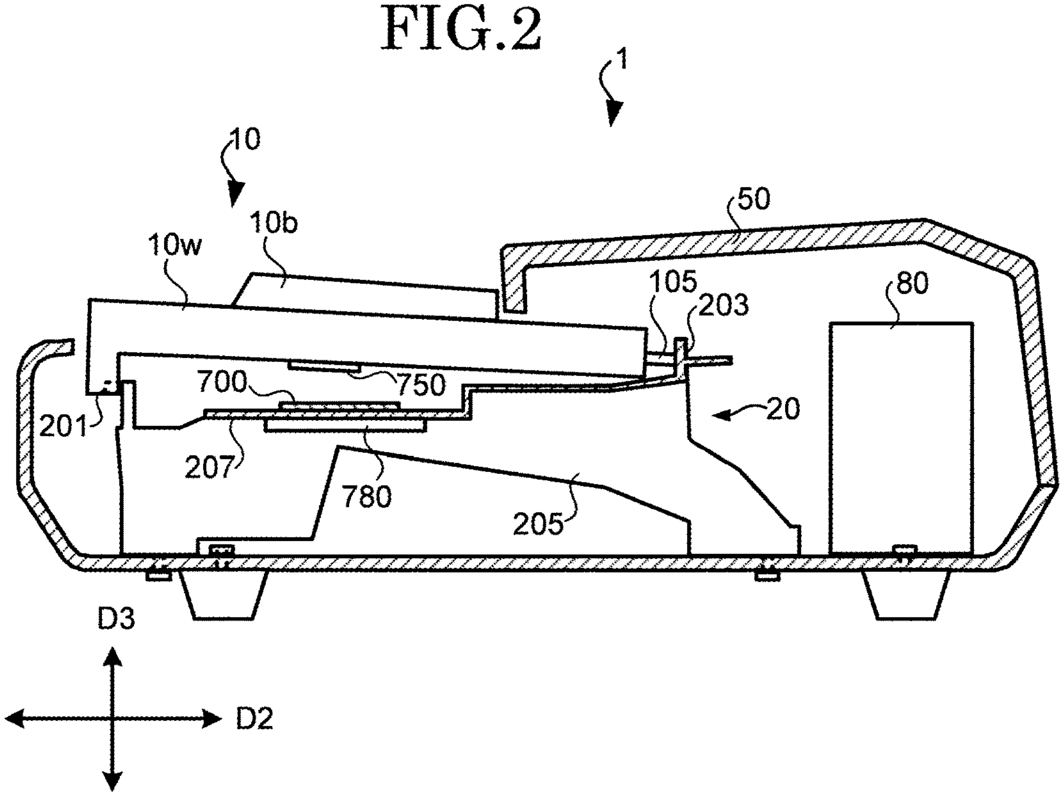
FIG. 2 is a diagram explaining an inner structure (when a key is released) of a keyboard apparatus in the first embodiment of the present disclosure.
Figure 3:
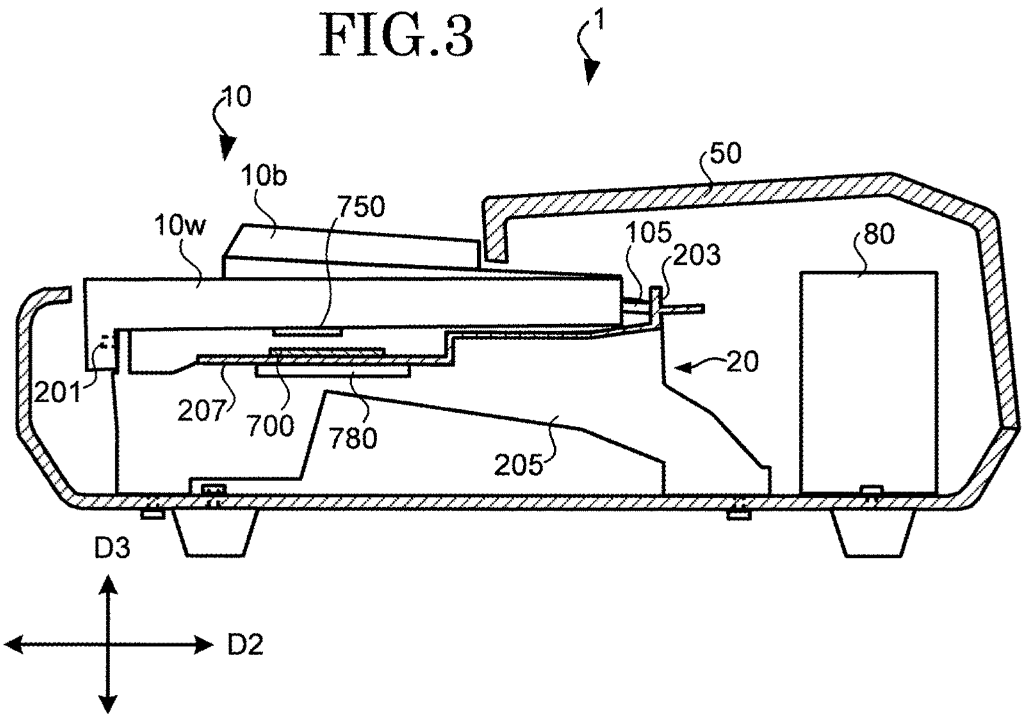
FIG. 3 is a diagram explaining an inner structure (when a white key is depressed) of a keyboard apparatus in the first embodiment of the present disclosure.

FIG. 2 is a diagram explaining an internal structure of the keyboard apparatus in the first embodiment of the present disclosure. FIG. 3 is a diagram explaining an internal structure of the keyboard apparatus (when a white key is depressed) in the first embodiment of the present disclosure. Among the keys 10, a configuration corresponding to a white key 10*w* is shown. Since a configuration corresponding to a black key 10*b* is the same as the configuration corresponding to the white key 10*w*, only the position of the black key 10*b* is shown, and other configurations are omitted.

A frame 20 is fixed to the casing 50 and supports the plurality of keys 10 arranged in the left-right direction D1. In this example, the frame 20 is formed of a resin material. The frame 20 includes a key guide portion 201, a key support portion 203, a rib portion 205 and a substrate holding portion 207.

The key guide portion 201 restricts the key 10 from moving in the left-right direction D1 by a member that slides with the key 10 below the front end portion of the key 10. The key support portion 203 supports an elastic portion 105 arranged at the rear end portion of the key 10. When the elastic portion 105 is deformed in the vertical direction, a free end side of the key 10 rotates with respect to the key support portion 203. In this case, since the key 10 is restricted from moving in the left-right direction D1 by the key guide portion 201, the key 10 rotates with respect to the left-right direction D1 as a rotation axis. The rib portion 205 is a plate-shaped member having a plane including the front-back direction D2 and the vertical direction D3 (surface having the normal line in left-right direction D1). A plurality of rib portions 205 is arranged side by side in the left-right direction D1. Each of the plurality of rib portions 205 is connected to the key guide portion 201, the key support portion 203, and the substrate holding portion 207.

A substrate holding portion 207 is a plate-shaped member for holding the active circuit substrate 700 and a magnetic material 780. In this example, the active circuit substrate 700 is arranged on the upper surface side (a key 10 side) of the substrate holding portion 207, and the magnetic material 780 is arranged on the lower surface side (the side opposite to the key 10) of the substrate holding portion 207. A passive circuit substrate 750 is arranged on the lower surface side of the key 10 (the substrate holding portion 207 side). The passive circuit substrate 750 is held on the lower surface side of the key 10 by a holder or the like.

The active circuit substrate 700 and the passive circuit substrate 750 are, as will be described later, elements constituting the magnetic induction type sensor, which are components included in the keypress amount measuring unit 70 with the magnetic material 780. The passive circuit substrate 750 and the magnetic material 780 are provided corresponding to each key 10. In this example, although the active circuit substrate 700 is provided corresponding to the plurality of keys 10, it may be provided corresponding to each key 10.

When the key 10 is depressed in the state shown in FIG. 2, the active circuit substrate 700 approaches the passive circuit substrate 750 as shown in FIG. 3. Pressing amount information output by the keypress amount measuring unit 70 is information corresponding to a distance between the active circuit substrate 700 and the passive circuit substrate 750.

[3. Structure of Keypress Amount Measuring Unit 70]

The keypress amount measuring unit 70 (a first sensor and a second sensor) includes the active circuit substrate 700, the passive circuit substrate 750 and the magnetic material 780 as described above. The active circuit substrate 700 includes a coil (hereinafter referred to as an active coil) for forming a magnetic field by the supplied power. When the passive circuit substrate 750 including the coil (hereinafter, referred to as a passive coil) moves in the magnetic field, an active circuit 770 (see FIG. 4) generates anti-resonance according to the position of the passive coil by magnetic coupling. That is, the circuit characteristics of the active circuit 770 change, and the output of the signal obtained from the active circuit substrate 700 changes. Therefore, the distance between the active circuit substrate 700 and the passive circuit substrate 750 can be measured by the signal obtained from the active circuit substrate 700. Hereinafter, each configuration of the keypress amount measuring unit 70 will be described in detail.

[3-1. Structure of Passive Circuit Substrate 750]

Figure 4:
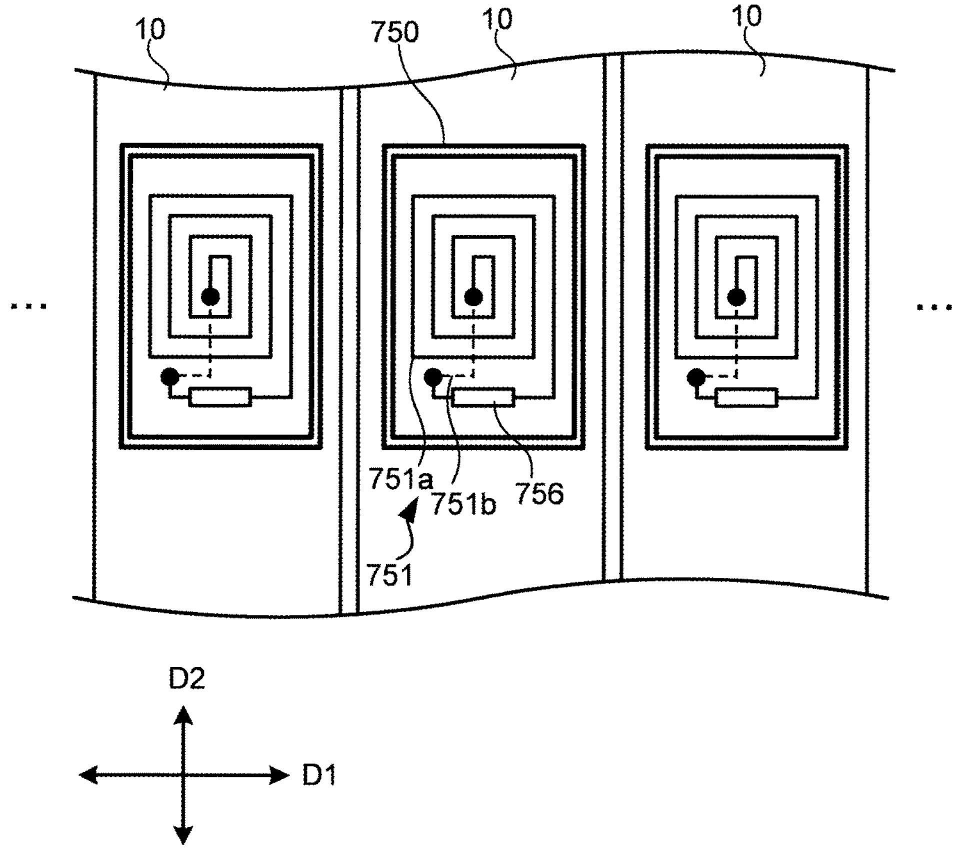
FIG. 4 is a diagram explaining a passive circuit substrate in the first embodiment of the present disclosure.

FIG. 4 is a diagram explaining a passive circuit substrate in a first embodiment of the present disclosure. FIG. 4 shows the passive circuit substrate 750 viewed from below. The passive circuit substrate 750 is a printed board including a passive coil 751 and a capacitor 756. The passive coil 751 (a first conductor, a second conductor, a third coil, a fourth coil) is formed on a substrate, includes a wiring 751*a* formed on the lower surface side (the active circuit substrate 700 side) of the substrate and a wiring 751*b* provided on the upper surface side (the key 10 side) of the substrate, and both ends of which are connected. The capacitor 756 is connected in series between both ends of the passive coil 751. In this example, a surface of the passive circuit substrate 750 (a surface on which the passive coil 751 is formed) is generally parallel to the upper surface of the key 10 (operation surface).

[3-2. Structure of Active Circuit Substrate 700]

Figure 5:
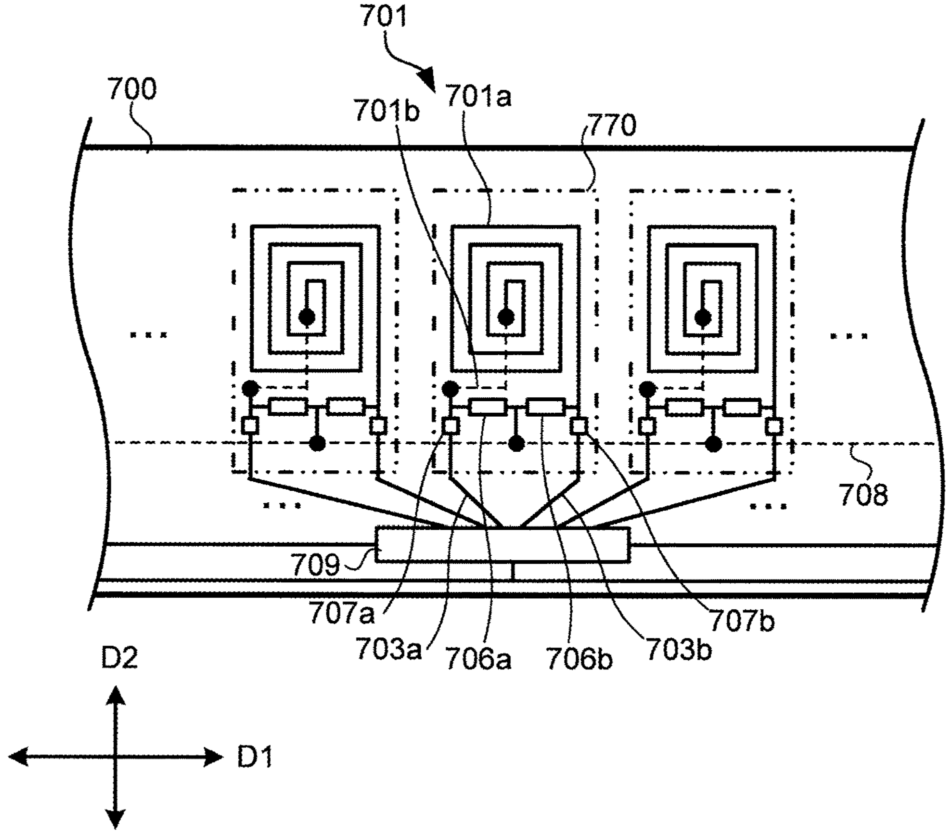
FIG. 5 is a diagram explaining an active circuit substrate in the first embodiment of the present disclosure.

FIG. 5 is a diagram explaining an active circuit substrate according to the first embodiment of the present disclosure. FIG. 5 illustrates the active circuit substrate 700 viewed from above. The active circuit substrate 700 is a printed board including a plurality of active circuits 770, a multiplexer 709 and various wirings (a clock signal line, a select signal line, an input signal line, an output signal line, etc. in addition to a ground wiring 708). Also, the active circuit substrate 700 includes a signal processing circuit (not shown). Each of the plurality of active circuits 770 is provided corresponding to each key 10. Two wirings connecting the active circuit 770 and the multiplexer 709 correspond to a signal input portion 703*a* and a signal output portion 703*b*.

An active circuit 770 includes an active coil 701, capacitors 706*a*, 706*b*, and resistors 707*a*, 707*b*. The active coil 701 (a first coil, a second coil) is formed on the substrate. The active coil 701 includes a wiring 701*a* formed on the upper surface side (the key 10 side) of the substrate and a wiring 701*b* provided on the lower surface side (the substrate holding portion 207 side) of the substrate, both ends of which are connected. In FIG. 5, a configuration arranged on the lower surface of a substrate is shown by a dashed line. The capacitors 706*a* and 706*b* are connected in series between both ends of the active coil 701. A grounding wiring 708 is connected between the capacitor 706*a* and the capacitor 706*b*. The grounding wiring 708 is provided in common for each active circuit 770. The resistor 707*a* is connected between the capacitor 706*a* and a signal input portion 703*a*, and the resistor 707*b* is connected between the capacitor 706*b* and a signal output portion 703*b*.

When an AC signal is input to the signal input portion 703*a* via the multiplexer 709, the active coil 701 forms a magnetic field corresponding to the input signal, and the active coil 701 and a passive coil 751 are magnetically coupled to each other, thereby modulating a signal (a first signal and a second signal) output from the signal output portion 703*b*. The modulated signal is output to a signal processing circuit (not shown) via the multiplexer 709 and converted into pressing amount information. The signal processing circuit outputs key information and the pressing amount information of the key 10 corresponding to the signal obtained by the multiplexer 709.

[3-3. Positional Relationship Between the Active Circuit 770 and the Magnetic Material 780]

Figure 6:
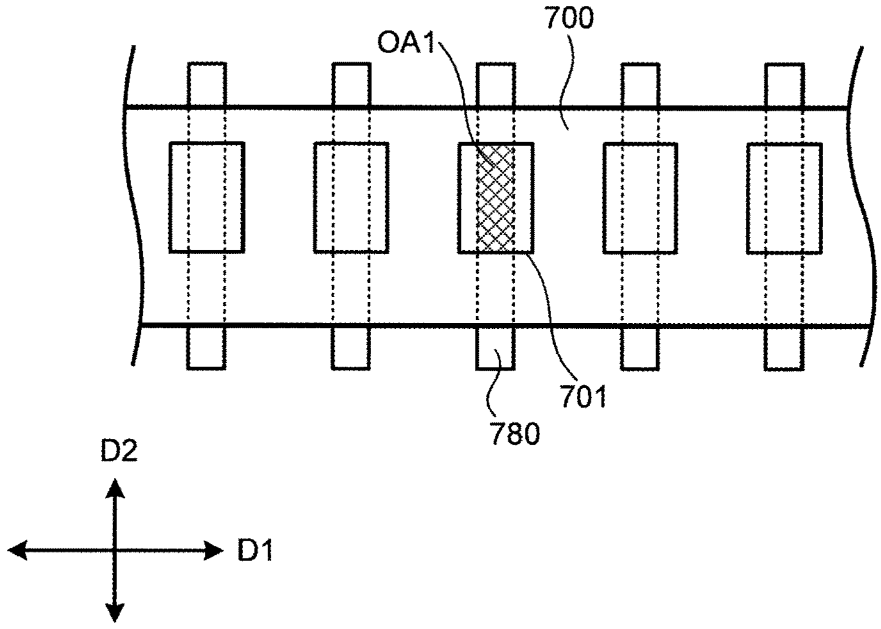
FIG. 6 is a diagram explaining a positional relationship between an active coil and a magnetic material in the first embodiment of the present disclosure.

FIG. 6 is a diagram explaining a positional relationship between the active coil and the magnetic material in the first embodiment of the present disclosure. FIG. 6 shows the positional relationship between the active coil 701 and the magnetic material 780 in the active circuit substrate 700 viewed from above. In order to simply show the positional relationship, illustrations of other components are omitted.

As shown in FIG. 6, the magnetic material 780 (a first magnetic material, a second magnetic material) has a rod shape extending in the front-back direction D2, and the positional relationship with the active coil 701 is fixed. The adjacent magnetic materials 780 are separated from each other. The magnetic material 780 includes a part overlapping the active coil 701 (hereinafter, referred to as an overlapping part OA1) and a part extending from the overlapping part OA1 to the active coil 701 in the front-back direction D2. In this example, although the magnetic material 780 extends from the overlapping part OA1 in both the front direction (corresponding to the front end direction of the key) and the back direction (corresponding to the back end direction of the key), it may extend in only one of the directions.

A length along the left-right direction D1 of the magnetic material 780 is desirably the same as or even smaller than a length along the left-right direction D1 of the active coil 701. In this example, the active coil 701 includes the overlapping part OA1 which overlaps with the magnetic material 780 and a part that expands in the left-right direction D1 with respect to the overlapping part OA1.

Since the active coil 701 and the magnetic material 780 have a positional relationship as shown in FIG. 6, the magnetic field formed by the active coil 701 hardly spreads in the left-right direction D1 under the influence of the magnetic material 780. Therefore, as compared with the case when the magnetic material 780 is not arranged, it is possible to reduce the interference due to the magnetic field formed by the respective active coils 701 adjacent to the left-right direction D1.

Figure 7:
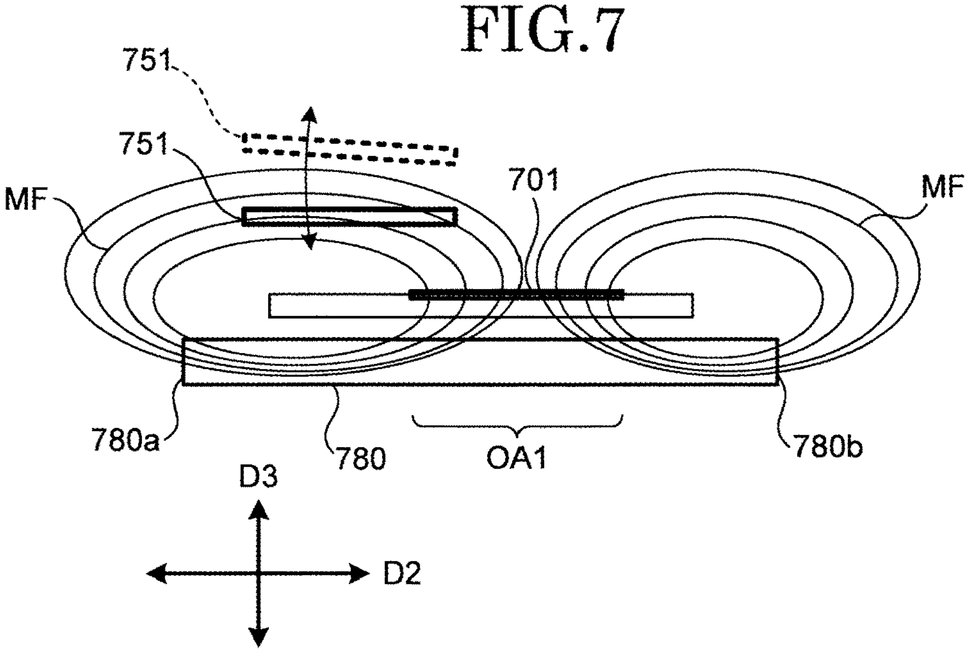
FIG. 7 is a diagram explaining a positional relationship between an open magnetic circuit formed by the active coil and a passive coil in the first embodiment of the present disclosure.

FIG. 7 is a diagram explaining a positional relationship between the open magnetic circuit formed by the active coil and the passive coil in the first embodiment of the present disclosure. FIG. 7 further clarifies the positional relationship between the active coil 701 and the magnetic material 780 shown in FIG. 2 and FIG. 3, and further schematically shows a magnetic flux MF corresponding to the magnetic field formed by the active coil 701. The passive coil 751 indicated by a dashed line indicates a position when a key is released (corresponding to FIG. 2), and the passive coil 751 indicated by a solid line indicates a position when a key is depressed (corresponding to FIG. 3). The magnetic flux MF passes through the magnetic material 780 as a magnetic path, and the magnetic flux MF has a path to return from the vicinity of end portions 780*a* and 780*b* of the magnetic material 780 to the active coil 701 via the space. As described above, the magnetic material 780 forms an open magnetic circuit with the active coil 701.

When the passive coil 751 moves in the magnetic flux MF, an induced current corresponding to the density of the magnetic flux MF passing through the passive coil 751 at that position occurs in the passive coil 751, and an output signal from the active circuit substrate 700 obtained via the active coil 701 is changed. In other words, it can be said that the output signal changes according to the distance between the active coil 701 and the passive coil 751 or changes according to the distance between the end portion 780*a* of the magnetic material 780 and the passive coil 751. Also, in this example, a positional relationship is realized whereby the active coil 701 is arranged between the passive coil 751 and at least a part of the magnetic material 780, and the magnetic material 780 is not arranged between the active coil 701 and the passive coil 751. This positional relationship may be realized when the key 10 is present in at least any one range in a range of movement. The above explanation is the description of the structure of the keypress amount measuring unit 70.

As described above, according to the keyboard apparatus 1 in the first embodiment of the present disclosure, it is possible to measure the pressing amount of the key 10 using the magnetic induction type sensor in the keypress amount measuring unit 70. In this case, by arranging the magnetic material 780, it is possible to control the range of the magnetic field formed by the active coil 701 and reduce the interference between the sensors corresponding to the adjacent keys 10. Therefore, as compared with the case where the magnetic material 780 is not used, it is possible to realize the keyboard apparatus 1 in which the measurement accuracy of the keypress amount is improved.

Second Embodiment

In the second embodiment, an example is described in which a magnetic material corresponding to the passive circuit substrate 750 is further provided in the first embodiment.

Figure 8:
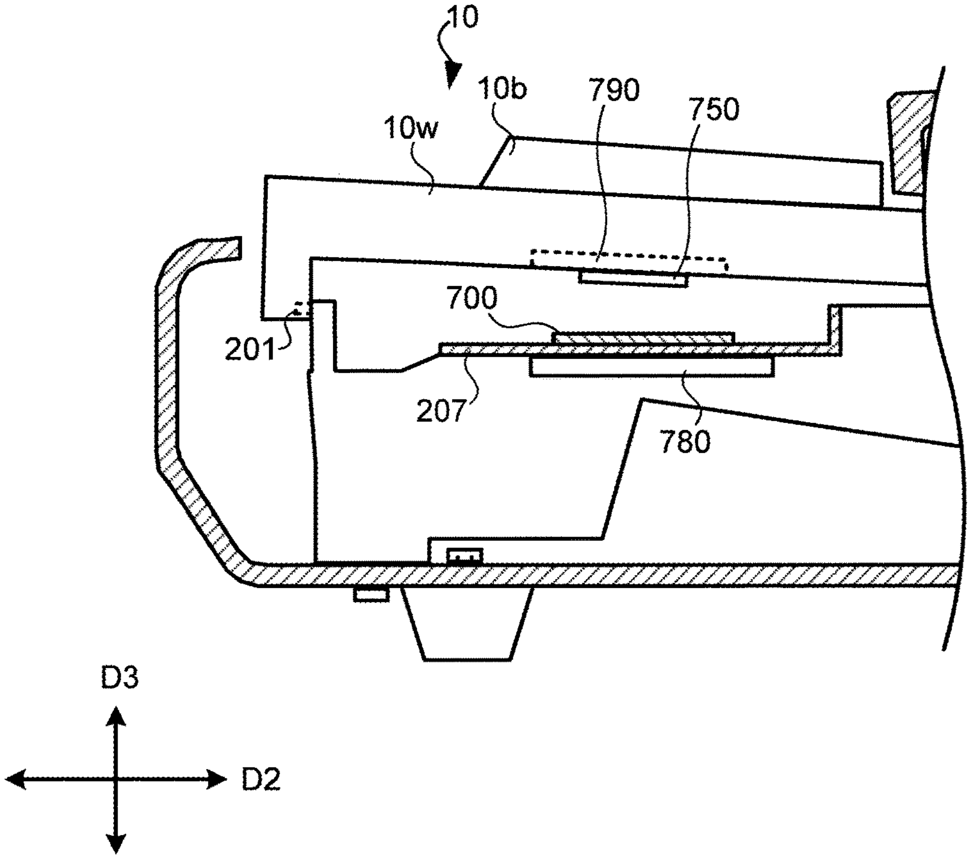
FIG. 8 is a diagram explaining an inner structure (when a key is released) of a keyboard apparatus in a second embodiment of the present disclosure.
Figure 9:
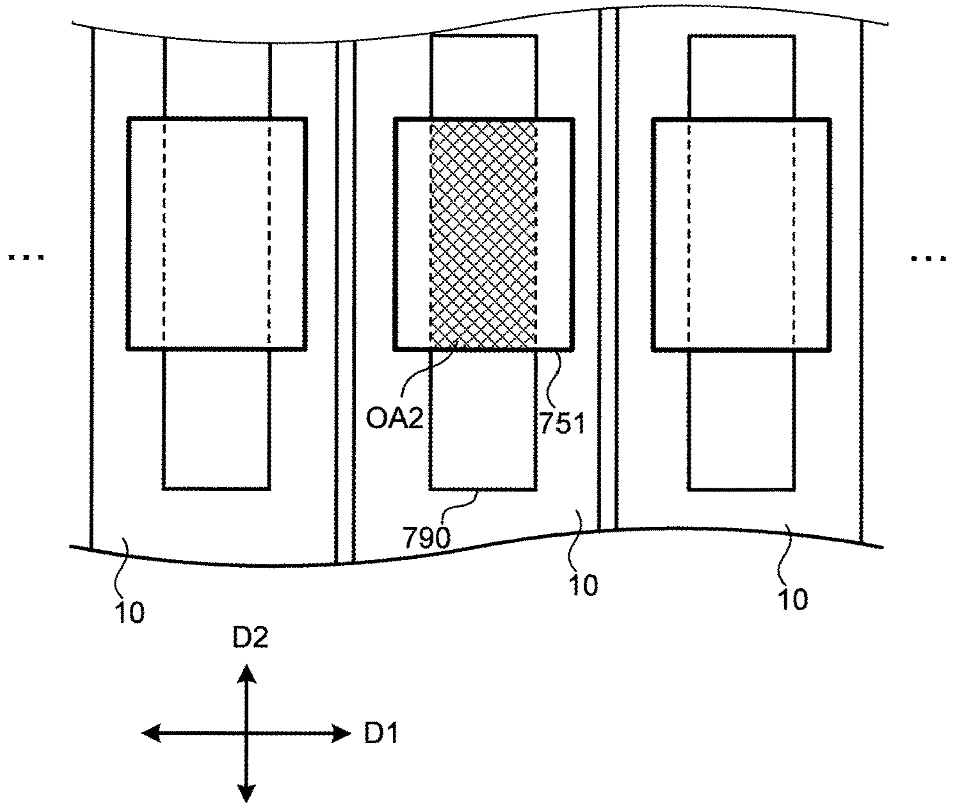
FIG. 9 is a diagram explaining a positional relationship between a passive coil and a magnetic material in the second embodiment of the present disclosure.

FIG. 8 is a diagram explaining an inner structure (when a key is released) of a keyboard apparatus in the second embodiment of the present disclosure. FIG. 9 is a diagram explaining a positional relationship between a passive coil and a magnetic material in the second embodiment of the present disclosure. FIG. 8 is a view corresponding to FIG. 2 and shows the vicinity of the key 10 in an enlarged manner. FIG. 9 is a diagram corresponding to FIG. 4. A magnetic material 790 in the second embodiment (a third magnetic material, a fourth magnetic material) has a rod shape extending in the front-back direction D2, and is arranged embedded in the key 10. The magnetic material 790 includes a part overlapping the active coil 701 (hereinafter, referred to as an overlapping part OA2), and a part extending from the overlapping part OA2 to the passive coil 751 in the front-back direction D2. In this example, although the magnetic material 790 extends from the overlapping part OA2 in both the front direction (corresponding to the front end direction of the key) and the back direction (corresponding to the back end direction of the key), it may extend in only one of the directions.

Also, a length along the left-right direction D1 of the magnetic material 790 is desirably the same as or even smaller than a length along the left-right direction D1 of the passive coil 751. In this example, the passive coil 751 includes the overlapping part OA2 with the magnetic material 790 and a part that expands in the left-right direction D1 with respect to the overlapping part OA2.

As described above, by providing the magnetic material 790 also in the passive coil 751 side, the magnetic flux MF is easily formed so that the magnetic material 790 is used as a magnetic path when the passive coil 751 approaches the active coil 701. As a result, the magnetic flux MF passing through the passive coil 751 is increased more than in the case where the magnetic material 790 is not used, and it is possible to realize the magnetic coupling more efficiently between the passive coil 751 and the active coil 701. Therefore, as compared with the case of the first embodiment, even if the passive coil 751 is positioned right above the active coil 701, it is possible to effectively utilize the magnetic flux MF. It is also possible to reduce the leakage of the magnetic flux MF upward of the key 10. In addition, by adjusting the size and the weight of the magnetic material 790, it can also be used to adjust the physical touch feeling towards the key 10.

Third Embodiment

In the third embodiment, instead of the magnetic material 780 of the first embodiment, an example is described in which a magnetic material 780A having a shape different from that of the magnetic material 780 is used.

Figure 10:
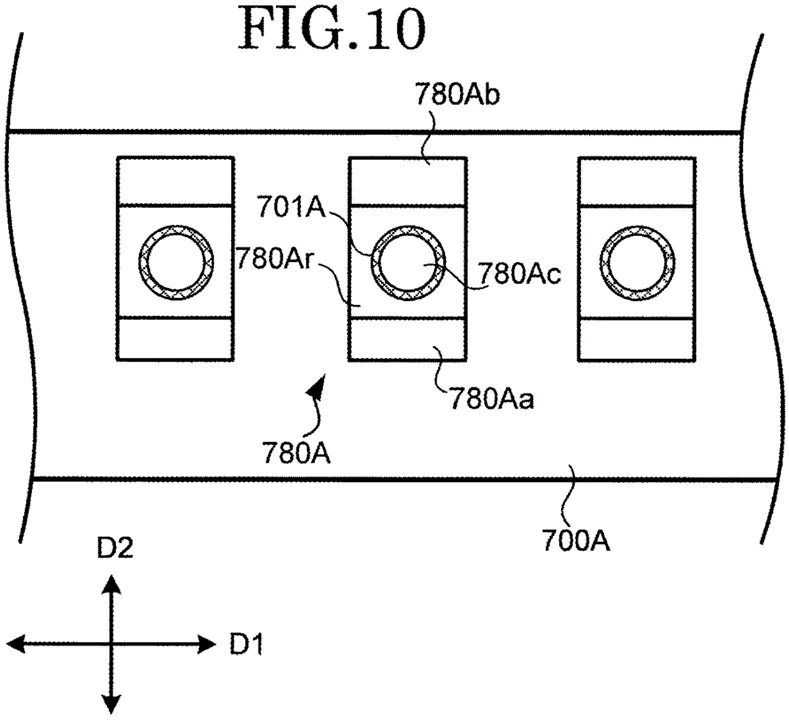
FIG. 10 is a diagram explaining an active circuit substrate in a third embodiment of the present disclosure.
Figure 11:
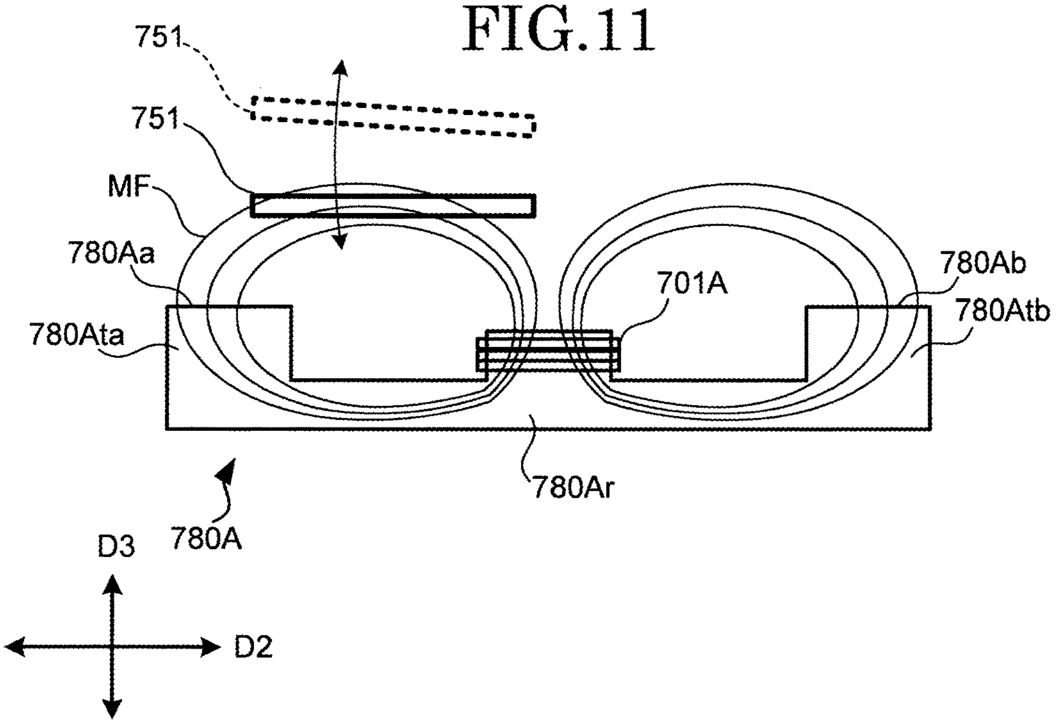
FIG. 11 is a diagram explaining a positional relationship between an open magnetic circuit formed by an active coil and a passive coil in the third embodiment of the present disclosure.

FIG. 10 is a diagram explaining an active circuit substrate in the third embodiment of the present invention. FIG. 11 is a diagram explaining a positional relationship between an open magnetic circuit formed by an active coil and a passive coil in the third embodiment of the present invention. FIG. 10 is a diagram corresponding to FIG. 6 and shows an expanded view of the vicinity of the key 10. FIG. 11 is a diagram corresponding to FIG. 7.

The magnetic material 780A in the third embodiment includes a flat plate portion 780Ar, protrusion parts 780Ata, 780Atb, and a central portion 780Ac. The flat plate portion 780Ar has a rectangular parallelepiped shape and is arranged in an active circuit substrate 700A. The protrusion parts 780Ata and 780Atb are parts protruding upwards (the key 10 side) at both end portions of the flat plate portion 780Ar and have a rectangular parallelepiped shape. End portions 780Aa, 780Ab of the magnetic material 780A corresponds to the upper side of the protrusion parts 780Ata, 780Atb. The central portion 780Ac is a portion protruding upwards (the key 10 side) in the central portion of the flat plate portion 780Ar and has a cylindrical shape.

An active coil 701A is wound around the central portion 780Ac. In other words, a part of the magnetic material 780A (the central portion 780Ac) passes through the internal space of the active coil 701A. The active coil 701A is formed by a conductor different from the wiring formed on the active circuit substrate 700A and is connected to a multiplexer 709 (see FIG. 5) via the wiring on the active circuit substrate 700A. As shown in FIG. 11, the magnetic flux MF corresponding to the magnetic field formed in the active coil 701A passes through the magnetic material 780A as a magnetic path and has a path to return from the vicinity of end portions 780Aa and 780Ab to the active coil 701A (the central portion 780Ac) via the space. Also in this embodiment, the magnetic material 780A forms an open magnetic circuit with the active coil 701A.

Fourth Embodiment

In the fourth embodiment, instead of the magnetic material 780A of the third embodiment, an example is described in which a magnetic material 780B having a form different from that of the magnetic material 780A is used. The fourth embodiment is the same as the third embodiment in that a part of the magnetic material is arranged in the internal space of the active coil. In addition, unlike the third embodiment, this example is a configuration that can be realized even if a part of the magnetic material is arranged between the active coil 701 and the passive coil 751.

Figure 12:
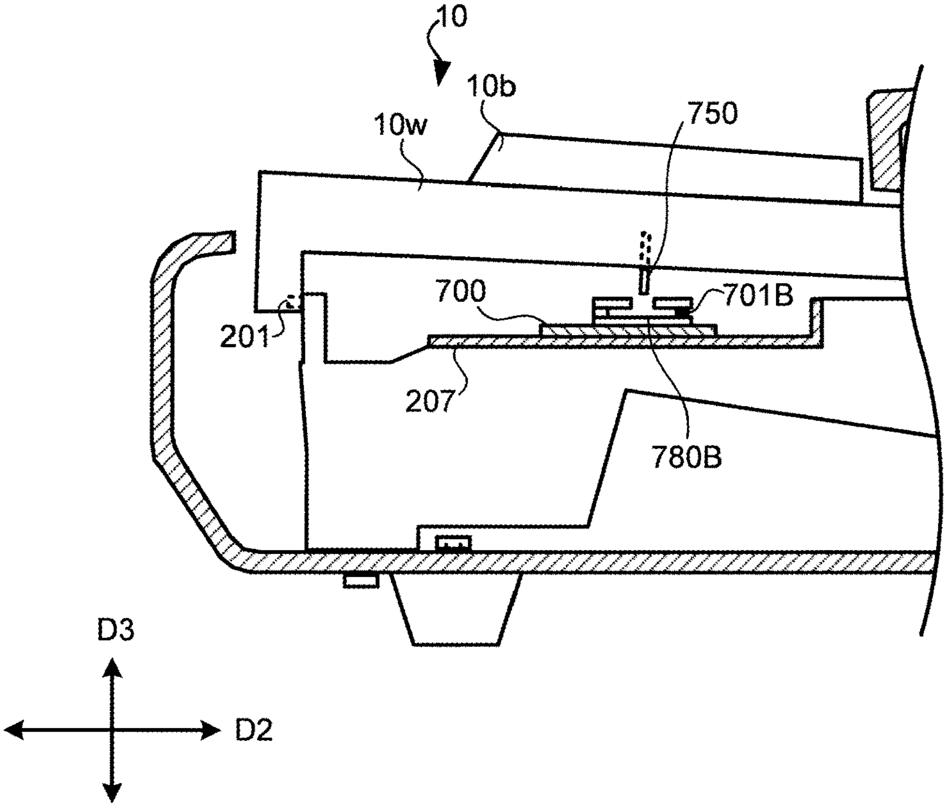
FIG. 12 is a diagram explaining an inner structure (when a key is released) of a keyboard apparatus in a fourth embodiment of the present disclosure.
Figure 13:
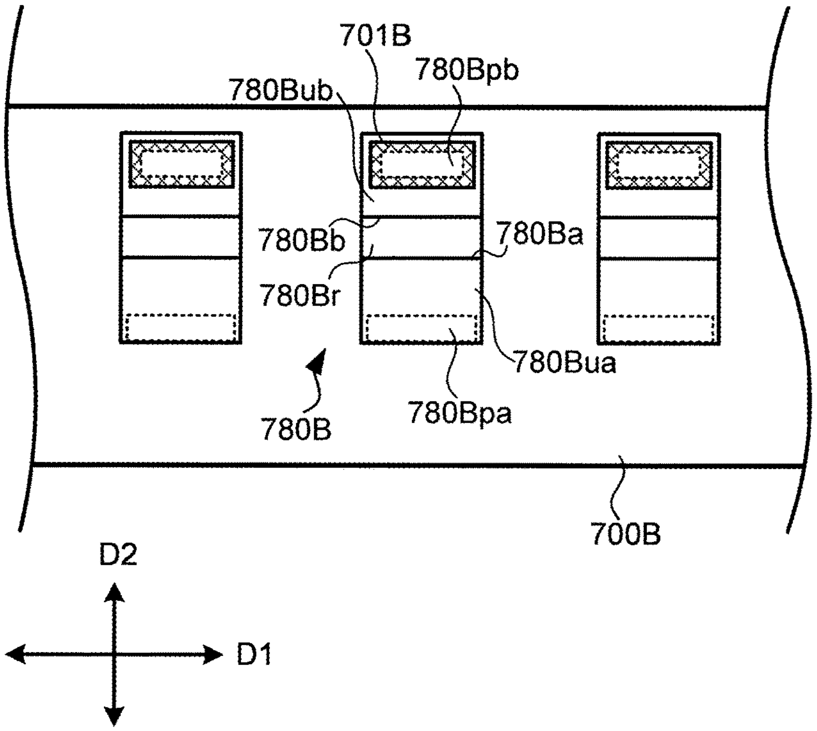
FIG. 13 is a diagram explaining an active circuit substrate in the fourth embodiment of the present disclosure.
Figure 14:
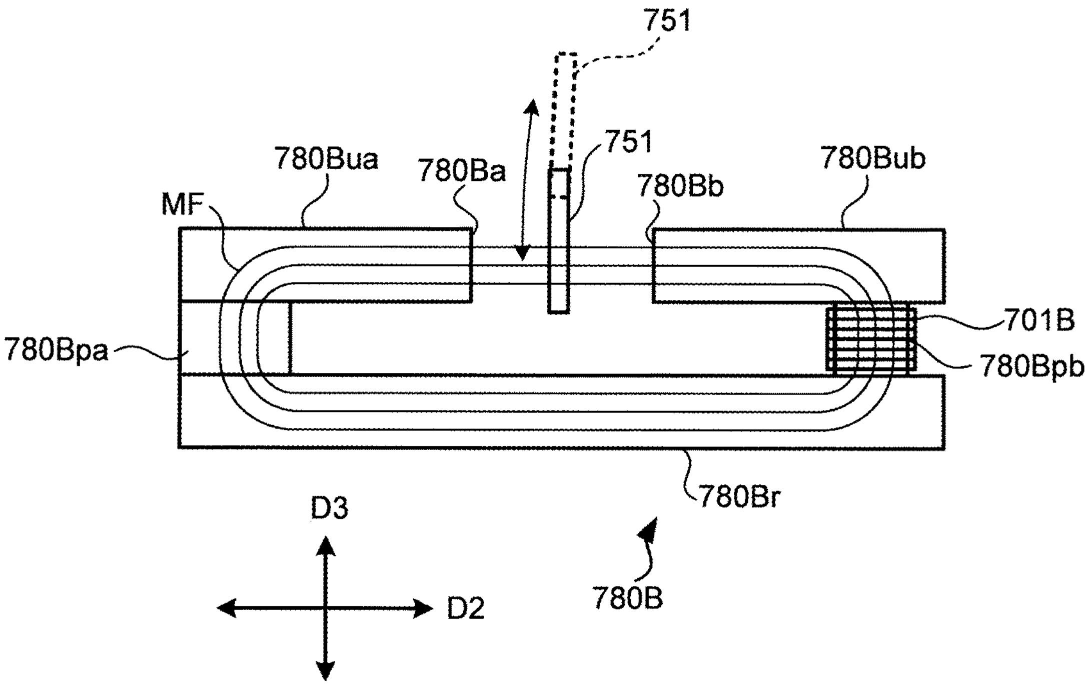
FIG. 14 is a diagram explaining a positional relationship between an open magnetic circuit formed by an active coil and a passive coil in the fourth embodiment of the present disclosure.

FIG. 12 is a diagram explaining an inner structure of a keyboard apparatus in the fourth embodiment of the present invention. FIG. 13 is a diagram explaining an active circuit substrate in the fourth embodiment of the present invention. FIG. 14 is a diagram explaining a positional relationship between an open magnetic circuit formed by an active coil and a passive coil in the fourth embodiment of the present invention. FIG. 12 is a diagram corresponding to FIG. 2 and shows and expanded view of the vicinity of the key 10. FIG. 13 is a diagram corresponding to FIG. 6. FIG. 14 is a diagram corresponding to FIG. 7.

The passive circuit substrate 750 in the fourth embodiment is arranged so as to protrude downwards from the key 10. That is, the passive circuit substrate 750 is supported by the key 10 by being partially embedded in the key 10. In this example, the passive circuit substrate 750 is arranged so as to protrude perpendicularly to the surface of the key 10, and in addition, the central axis of the passive coil 751 is arranged so as to face the longitudinal direction of the key 10.

The magnetic material 780B in the fourth embodiment includes a flat plate portion 780Br, pillar portions 780Bpa, 780Bpb, and an upper plate portion 780Bua, 780Bub. The flat plate portion 780Br has a rectangular parallelepiped shape and is arranged in an active circuit substrate 700B. The pillar portions 780Bpa and 780Bpb are portions protruding upwards (the key 10 side) at both end portions of the flat plate portion 780Br and have a rectangular parallelepiped shape. The upper plate portion 780Bua is a portion extending from the upper end of the pillar portion 780Bpa and has a rectangular parallelepiped shape. The upper plate portion 780Bub is a portion extending from the upper end of the pillar portion 780Bpb and has a rectangular parallelepiped shape.

An end portion 780Ba of the magnetic material 780B is an end portion of the upper plate portion 780Bua opposite to the pillar portion 780Bpa. An end portion 780Bb of the magnetic material 780B is an end portion of the upper plate portion 780Bub opposite to the pillar portion 780Bpb. The end portion 780Ba and the end portion 780Bb are opposed to each other to form a predetermined space therebetween.

An active coil 701B is wound around the pillar portion 780Bpb. In other words, a part of the magnetic material 780B (the pillar portion 780Bpb) passes through the internal space of the active coil 701B. The active coil 701B is formed by a conductor different from the wiring formed on the active circuit substrate 700B and is connected to the multiplexer 709 (see FIG. 5) via the wiring on the active circuit substrate 700B. As shown in FIG. 14, the magnetic flux MF corresponding to the magnetic field formed in the active coil 701B passes through the magnetic material 780B as a magnetic path and has a path to return from the vicinity of the end portion 780Ba to the end portion 780Bb via the predetermined space. Also in this example, the magnetic material 780B forms an open magnetic circuit together with the active coil 701B. The active coil 701B may be wound around a portion of the magnetic material 780B other than the pillar portion 780Bpa.

As shown in FIG. 14, when a key is released, the passive coil 751 (dashed line) is arranged at a position shifted in the vertical direction D3 with respect to the space between the end portion 780Ba and the end portion 780Bb. Since the passive coil 751 moves downward when a key is depressed, the passive coil 751 moves to a position between the end portion 780Ba and the end portion 780Bb. That is, the distance between the end portion 780Ba (the end portion 780Bb) and the passive coil 751 changes. As described above, when a key is depressed, the passive coil 751 enters the magnetic field which is stronger when a key is depressed than when a key is released. Also, after the passive coil 751 has entered the position between the end portion 780Ba and the end portion 780Bb, it can also be said that it is not clear which part the distance between the end portion 780Ba (the end portion 780Bb) and the passive coil 751 corresponds to. Here, it is defined that the larger the area of the passive coil 751 entering the space between the end portion 780Ba and the end portion 780Bb, the smaller the distance between the end portion 780Ba (the end portion 780Bb) and the passive coil 751.

Fifth Embodiment

In the fifth embodiment, an example is described in which the magnetic material 780A in the third embodiment is tilted by 90 degrees and the side surfaces of the magnetic material 780A are arranged to be parallel to the surface of the substrate.

Figure 15:
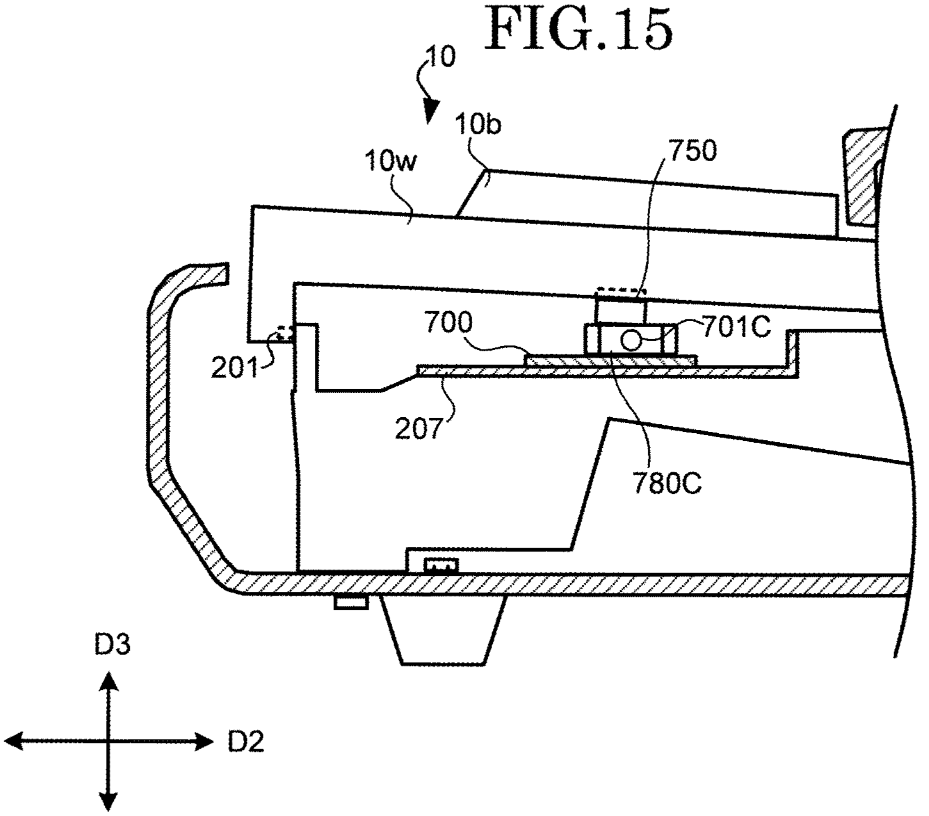
FIG. 15 is a diagram explaining an inner structure (when a key is released) of a keyboard apparatus in a fifth embodiment of the present disclosure.
Figure 16:
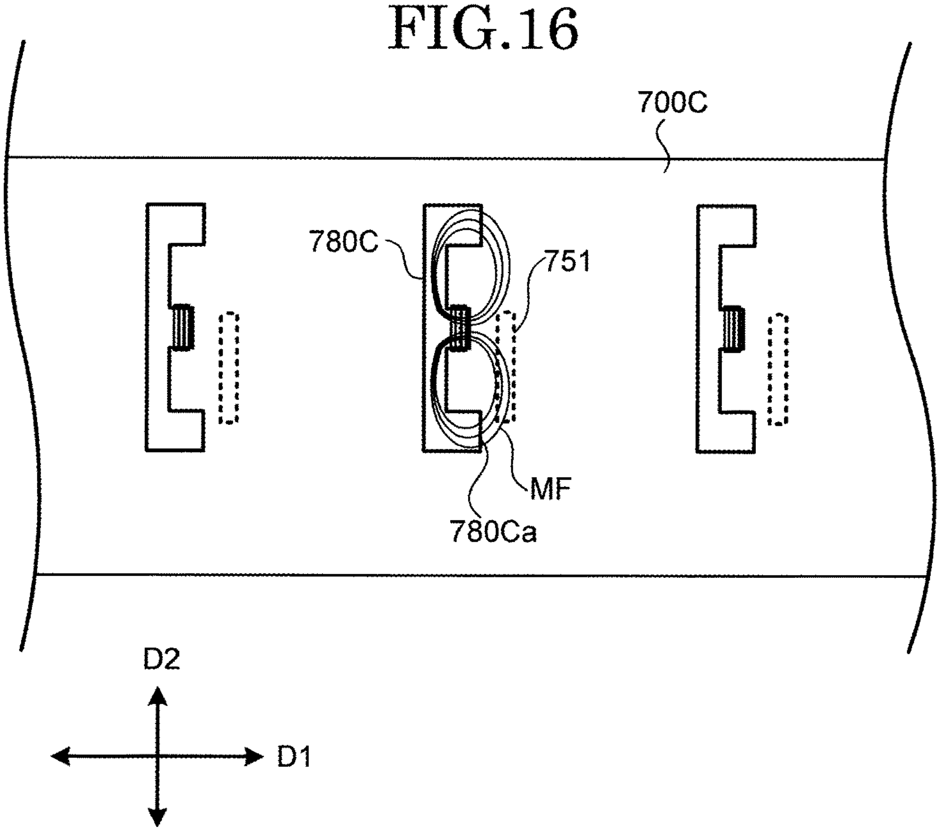
FIG. 16 is a diagram explaining a positional relationship between an open magnetic circuit formed by an active coil and a passive coil in the fifth embodiment of the present disclosure.

FIG. 15 is a diagram explaining an inner structure (when a key is released) of a keyboard apparatus in the fifth embodiment of the present invention. FIG. 16 is a diagram explaining a positional relationship between an open magnetic circuit formed by an active coil and a passive coil in the fifth embodiment of the present invention. FIG. 15 is a diagram corresponding to FIG. 2 and shows and expanded view of the vicinity of the key 10. FIG. 16 is a diagram corresponding to FIG. 6. Also, the passive coil 751 shown by a dashed line in FIG. 6 shows the position of the passive coil 751 when a key is depressed.

The passive circuit substrate 750 in the fifth embodiment is arranged to protrude downwards from the key 10. That is, the passive circuit substrate 750 is supported by the key 10 by being partially embedded in the key 10. In this example, the passive circuit substrate 750 is arranged so as to protrude perpendicular to the surface of the key 10, and in addition, the central axis of the passive coil 751 is arranged so as to face the scale direction (the left-right direction D1).

As shown in FIG. 16, a magnetic field is formed in the left-right direction D1 (left side in FIG. 16) with respect to a magnetic material 780C. As described above, since the magnetic path is restricted by the magnetic material 780C, the magnetic flux MF does not expand in the vertical direction D3. When a key is released, as shown in FIG. 15, the passive coil 751 is arranged at a position shifted in the vertical direction D3 with respect to the magnetic material 780C. Since the passive coil 751 moves downwards when a key is depressed, the passive coil 751 moves to a position facing the magnetic material 780C. That is, the distance between an end portion 780Ca of the magnetic material 780C and the passive coil 751 changes. Therefore, the passive coil 751 enters the magnetic field which is stronger when a key is depressed than when a key is released.

Sixth Embodiment

In the sixth embodiment, an example is described in which the passive circuit substrate 750 is arranged in a member interlocking with the key 10.

Figure 17:
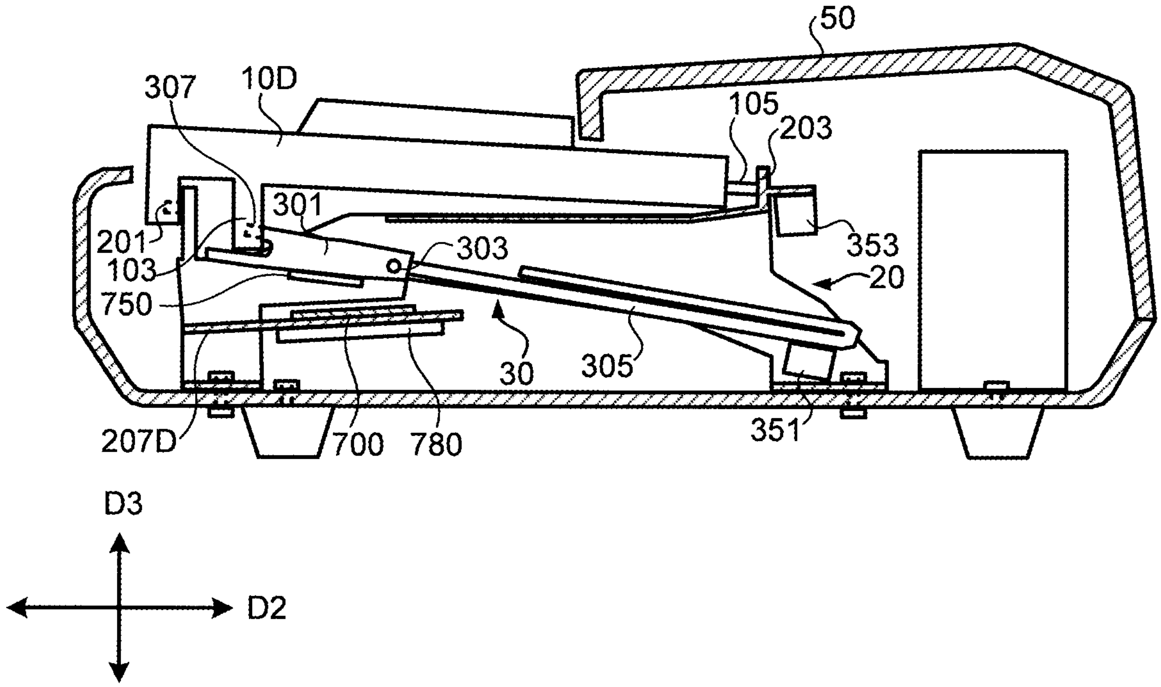
FIG. 17 is a diagram explaining an inner structure (when a key is released) of a keyboard apparatus in a sixth embodiment of the present disclosure.
Figure 18:
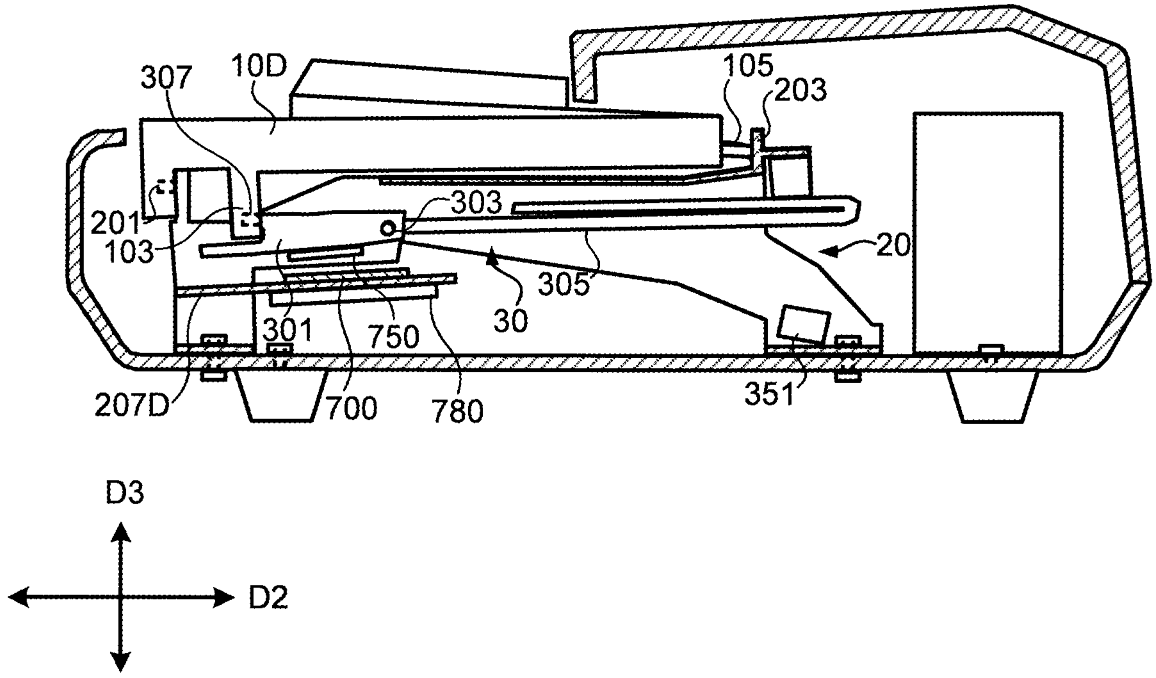
FIG. 18 is a diagram explaining an inner structure (when a white key is depressed) of a keyboard apparatus in the sixth embodiment of the present disclosure.

FIG. 17 is a diagram explaining an inner structure (when a key is released) of a keyboard apparatus in the sixth embodiment of the present disclosure. FIG. 18 is a diagram explaining an inner structure (when a white key is depressed) of a keyboard apparatus in the sixth embodiment of the present disclosure. FIG. 17 is a diagram corresponding to FIG. 2. FIG. 18 is a diagram corresponding to FIG. 3. A keyboard apparatus D1 in the sixth embodiment includes a loaded part 30 arranged corresponding to each key 10D. The key 10D is connected to the loaded part 30. As a result, the key 10D and the load unit 30 are coupled and connected at a key connecting portion 301 (a sliding part 307) of the load unit 30, thereby interlocking with each other.

The loaded part 30 includes the key connecting portion 301, a bearing 303, and a weight portion 305. The bearing 303 is provided corresponding to a shaft portion provided on a frame 20. The key connecting portion 301 is arranged on the opposite side of the weight portion 305 with respect to the bearing 303. The sliding part 307 provided at one end of the key connecting portion 301 slides against a load connecting part 103 provided below the key 10D. The loaded part 30 has a center of gravity present closer to the weight portion 305 than the bearing 303. Therefore, by placing the weight portion 305 on a lower stopper 351 when the key 10D is not depressed, the loaded part 30 holds the key 10 at the rest position (corresponding to when a key is released). When the key 10D is depressed, the weight portion 305 moves upward by rotating the loading portion 30 about the bearing 303, further movement is restricted by colliding with an upper stopper 353. The lower stopper 351 and the upper stopper 353 are supported by the frame 20.

In this example, the passive circuit substrate 750 is arranged not in the key 10D but in the loaded part 30 interlocking with the key 10D. Specifically, the passive circuit substrate 750 is arranged on the lower surface of the key connecting portion 301 of the loaded part 30. Therefore, a substrate holding portion 207D, on which the active circuit substrate 700 is arranged, is arranged below the key connecting portion 301. When the key 10 is depressed in the state shown in FIG. 17, the key connecting portion 301 moves downward as shown in FIG. 18 and the active circuit substrate 700 approaches the passive circuit substrate 750. As described above, the passive circuit substrate 750 can be mounted to a variety of members as long as it is a member that moves in response to a keypress operation.

Also, with respect to the angle between the passive circuit substrate 750 and the active circuit substrate 700, the difference between when a key is released and when a key is depressed is larger than the difference in the first embodiment in which the passive circuit substrate 750 is mounted to the key 10. Even if the change in this angle is large, since the amount of magnetic flux passing through the passive coil 751 is changed, there is no problem even in the case of the positional relationship between the passive coil 751 and the active coil 701 as shown in the sixth embodiment.

Seventh Embodiment

In the seventh embodiment, an active circuit substrate 700E is described in which the configuration of the active coil 701 is changed without using the magnetic material 780.

Figure 19:
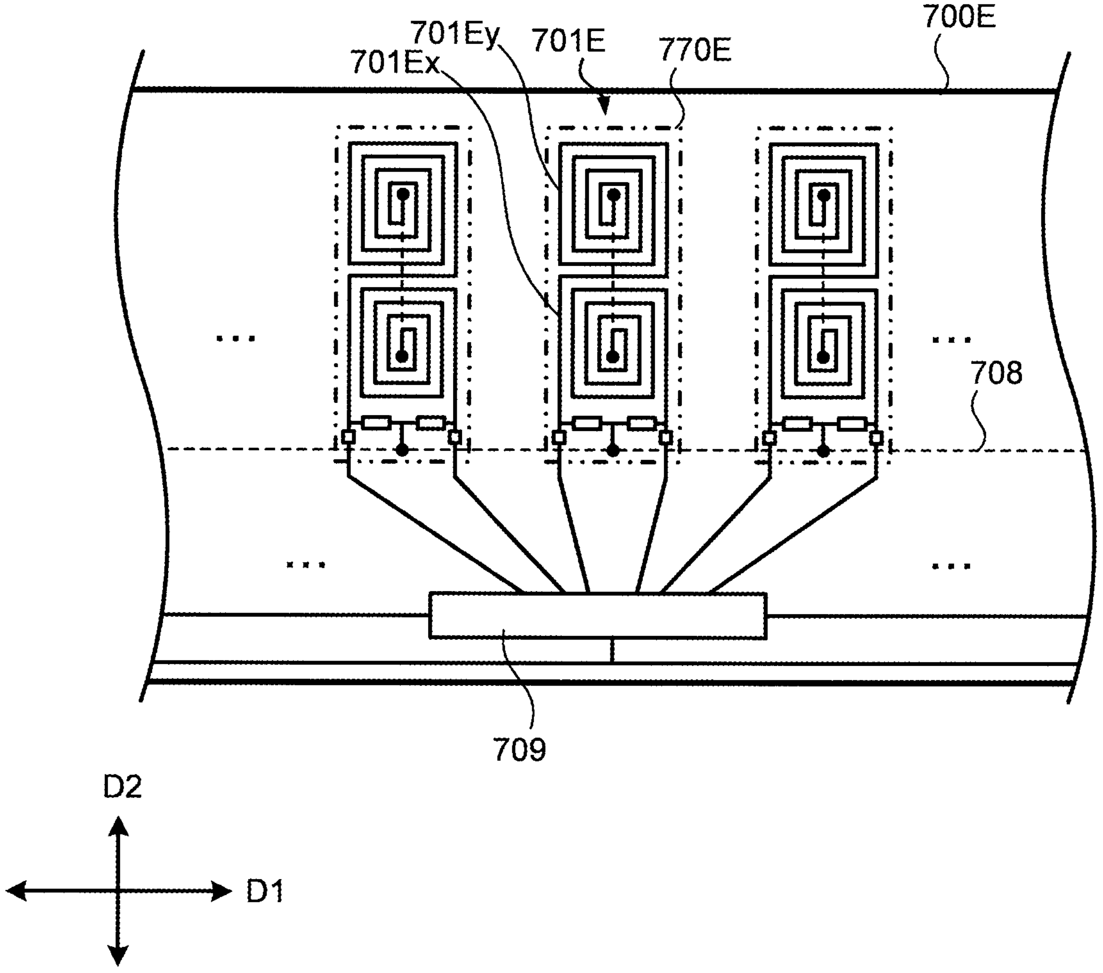
FIG. 19 is a diagram explaining an active circuit substrate in a seventh embodiment of the present disclosure.

FIG. 19 is a diagram explaining an active circuit substrate in the seventh embodiment of the present disclosure. The active circuit substrate 700E in the seventh embodiment includes an active coil 701E. The active coil 701E includes a first active coil 701Ex and a second active coil 701Ey. The first active coil 701Ex and the second active coil 701Ey are arranged side by side along the front-back direction D2, and these winding directions are opposite to each other. The fact that the winding direction is opposite does not mean that the wirings are constitutionally wound in the opposite direction, but wound so that the current flows in the opposite direction from each other. Therefore, the magnetic flux formed by the active coil 701E is formed so as to pass through the second active coil 701Ey immediately after exiting the first active coil 701Ex.

In this way, it is also possible to prevent the magnetic fields formed by the adjacent active coils 701E from interfering with each other. Therefore, in this case, the configuration corresponding to the magnetic material 780 may be omitted. In this example, it is desirable to adopt a configuration using the magnetic material 790 as in the second embodiment for the passive circuit substrate 750.

MODIFICATIONS

While an embodiment of the present invention has been described above, an embodiment of the present invention may be modified into various forms as follows. Also, the embodiments described above and the modifications described below can be applied in combination with each other. Further, it is possible to add, delete, or replace another configuration with respect to a part of the configuration of each embodiment. In the following description, although an example of modifying the first embodiment will be described, other embodiments may also be applied as a modified example.

(1) Although the passive coil 751 is provided in the passive circuit substrate 750, a metal plate may be provided instead of the passive coil 751. Even with this configuration, modulation of the output signal of the active circuit 770 can be realized by the eddy current generated in the metal plate as in the passive coil 751. That is, in the passive circuit substrate 750, instead of the coil, a conductor such as a metal plate or the like capable of absorbing energy through a magnetic field may be arranged.

(2) In the first embodiment, the active coil 701 is arranged on the frame 20 side, and the passive coil 751 is arranged on the key 10 side. Since the passive coil 751 does not require a power supply or the like, although it is easy to design a structure where it is provided on the structure having a movable portion, it is also possible to be arranged in the reverse relationship. That is, the active coil 701 may be arranged on the key 10 side and the passive coil 751 may be arranged on the frame 20 side. In this case, the configuration for performing power supply or the like in the substrate holder 170 may be arranged.

(3) Although the magnetic material 780 extends in the front-back direction D2, as long as it extends in a direction different from the left-right direction D1, it may extend in a direction inclined to at least one of the vertical direction and the left-right direction with respect to the front-back direction D2.

(4) Although the distance between the active coil 701 (or the end portion 780*a* of the magnetic material 780) and the passive coil 751 is closer when a key is depressed than when a key is released, it may be closer when a key is released. This configuration may be realized via a member interlocking with the key 10, and the active circuit substrate 700 may be arranged on the upper surface side of the key 10.

(5) Although one set of the active circuit 770 and the passive circuit substrate 750 has been provided for each key 10, a plurality of sets may be provided for each key 10. For example, the amount of movement of a plurality of member may be measured by a sensor for measuring the pressing amount of the key 10 as in the first embodiment and a sensor for measuring the amount of movement of the member interlocking with the key 10 as in the sixth embodiment. Also, the key 10 may be provided with a plurality of sensors. In this case, a range where the pressing amount can be measured may be different in each sensor.

(6) The coil shape of the active coil 701 may take various forms other than the various forms described above. Also, the active coil 701 may be implemented using a plurality of coils. The same configuration is applied to the passive coil 751. Various forms can be applied to the active coil 701 and the passive coil 751 as long as they have configurations that form a magnetic field in the active coil 701 and cause anti-resonance in the active circuit 770 via the magnetic field in the passive coil 751.

(7) Although an example in which the keypress amount measuring unit 70 is provided to an electronic keyboard instrument has been described, the keypress amount measuring unit 70 may be provided to a key of an acoustic piano. Also, the keypress amount measuring unit 70 is provided, in addition to the key of the acoustic piano, to a movable portion such as a pedal, and the moving amount of that portion may be measured.

(8) Although the keypress amount measuring unit 70 is provided in an electronic keyboard instrument to measure the pressing amount of the key 10, it may be provided in an electronic keyboard instrument to measure the moving amount of the movable portion other than the key 10 (for example, a pedal device). In addition, the configuration corresponding to the keypress amount measuring unit 70 is not limited to a keyboard instrument, and can be applied to other types of instruments such as a wind instrument and a guitar-shaped stringed instrument. As a result, it is possible to detect an operation on a key of a wind instrument, and an operation on a tremolo arm of an electronic stringed instrument, and the like. These types of instruments are included in the concept of a performance operation apparatus.

Also, although the performance operation apparatus includes an instrument having a sound source unit 80 and outputting a sound signal (the keyboard apparatus 1), and an instrument having a sound generation mechanism for generating a sound, the performance operation apparatus may include an apparatus that does not output a sound signal (e.g., MIDI controller) and an apparatus that does not generate sound itself (e.g., a pedaling mechanism). In this case, the key and the pedal are specified as operating elements for the performance operation. As described above, the performance operation apparatus includes an apparatus that controls the generation of sound and the generation mode of the sound to be changed and outputs a sound signal according to the operation of the operating element by the player (operator) with the head or foot.

Further, the keypress amount measuring unit 70 may be provided in an input device having operating elements such as a button, a slider, or the like for inputting an instruction from the user. In this case, the active circuit substrate 700 and the passive circuit substrate 750 may be used to measure the amount of operation on the operating element. Such an input device may be provided in a sound signal generation device that generates a sound signal by an operation to an operating element or it may be provided in a device that does not generate a sound signal. That is, it can be said that the key 10 is an example of an operating element for inputting an instruction of a user, the combination of the key 10 and the keypress amount measuring unit 70 is an example of an input device, and the keyboard apparatus 1 is an example of a sound signal generation device.

According to an embodiment of the present disclosure, it is possible to control a magnetic field formed by a coil of a magnetic induction type sensor.

What is claimed is:

1. An input device comprising:

a first operating element; and a first sensor including a first conductor, a first coil, and a first magnetic material, wherein the first coil and the first magnetic material form a first open magnetic circuit, wherein a positional relationship between the first coil and the first magnetic material is fixed, wherein a first distance between a first end portion of the first magnetic material and the first conductor varies based on an amount of operation on the first operating element, wherein the first sensor is configured to output a first signal based on the first distance, and wherein the first coil is configured to form a magnetic field corresponding to an input signal input to the first coil.

2. The input device according to claim 1, further comprising:

a second operating element disposed adjacent to the first operating element in a first direction; and a second sensor including a second conductor, a second coil, and a second magnetic material, wherein the second coil and the second magnetic material form a second open magnetic circuit, wherein the second sensor is configured to output a second signal based on a second distance between a second end portion of the second magnetic material and the second conductor, wherein the first magnetic material includes a first portion extending in a second direction different from the first direction with respect to the first coil, wherein the first end portion is positioned a side of the first portion in the first magnetic material, wherein the second magnetic material includes a second portion extending in the second direction with respect to the second coil, wherein a positional relationship between the second coil and the second magnetic material is fixed, wherein the second magnetic material is divided from the first magnetic material, wherein the second end portion is positioned a side of the second portion in the second magnetic material, and wherein the second distance varies based on an amount of operation on the second operating element.

3. The input device according to claim 2, wherein the first conductor is interlocked with the first operating element.

4. The input device according to claim 2, wherein the first conductor includes a third coil.

5. The input device according to claim 2, wherein a portion of the first magnetic material passes through an internal space of the first coil.

6. The input device according to claim 2, wherein the first coil is formed on a substrate, and the first coil is arranged between at least a portion of the first magnetic material and the first conductor at a position corresponding to one of a plurality of positions included in a range of movement of the first operating element.

7. The input device according to claim 2, wherein the first operating element and the second operating element have a longitudinal shape in the second direction.

8. A sound signal generation device comprising:

the input device according to claim 2; and a generation unit configured to generate a sound signal based on the first signal and the second signal.

9. The input device according to claim 1, wherein the first conductor is interlocked with the first operating element.

10. The input device according to claim 1, wherein the first conductor includes a third coil.

11. The input device according to claim 1, wherein a portion of the first magnetic material passes through an internal space of the first coil.

12. The input device according to claim 1, wherein the first coil is formed on a substrate, and the first coil is arranged between at least a portion of the first magnetic material and the first conductor at a position corresponding to one of a plurality of positions included in a range of movement of the first operating element.

* * * * *